United States Patent [19]
Darilek et al.

[11] Patent Number: 4,542,344
[45] Date of Patent: Sep. 17, 1985

[54] DETECTING BURIED PIPELINE DEPTH AND LOCATION WITH ELECTROMAGNETIC TRIANGULATION

[75] Inventors: Glenn T. Darilek, San Antonio; Edward H. Cooper, Jr., Somerset, both of Tex.

[73] Assignees: Corrosion Logging Service International, Lafayette, La.; Texas Gas Development Corporation, Owensboro, Ky.

[21] Appl. No.: 528,892

[22] Filed: Sep. 2, 1983

[51] Int. Cl.[4] .................. G01V 3/11; G01V 3/165
[52] U.S. Cl. .................................................. 324/326
[58] Field of Search ............... 324/67, 326, 329, 345, 324/207

[56] References Cited

U.S. PATENT DOCUMENTS

| | | | |
|---|---|---|---|
| 2,105,247 | 1/1938 | Jakosky . | |
| 2,974,276 | 3/1961 | Davis | 324/348 X |
| 3,617,865 | 11/1971 | Hakata | 324/67 X |
| 4,021,725 | 5/1977 | Kirkland | 324/345 X |
| 4,112,349 | 9/1978 | Weber . | |
| 4,134,061 | 1/1979 | Gudgel . | |
| 4,151,458 | 4/1979 | Seager . | |
| 4,220,913 | 9/1980 | Howell et al. . | |
| 4,258,323 | 3/1981 | Andrews et al. | 324/326 X |
| 4,295,095 | 10/1981 | Thomas et al. | 324/326 |
| 4,387,340 | 6/1983 | Peterman | 324/326 |
| 4,390,836 | 6/1983 | Bruce et al. | 324/326 X |

FOREIGN PATENT DOCUMENTS

| | | | |
|---|---|---|---|
| 219493 | 4/1957 | Australia | 324/67 |
| 66170 | 5/1979 | Japan | 324/326 |
| 526838 | 10/1976 | U.S.S.R. | 324/67 |

Primary Examiner—Gerard R. Strecker
Attorney, Agent, or Firm—Laurence R. Brown

[57] ABSTRACT

The depth and lateral offset position of an underground pipeline or the like is calculated by a surface located instrument carrying two spaced sets of orthogonal antennas sensing electromagnetic energy induced in and radiated from the pipeline. The resulting four signals are compared in amplitude to derive by simple triangulation calculations the depth and offset distances in a simple computer-display unit. Thus a set of continuous reading may be made automatically by a self-contained portable unit as an operator tracks the pipeline to make a survey. The readings may be recorded upon a medium advanced by a measuring instrument as a survey progresses along a pipeline.

4 Claims, 5 Drawing Figures

DETECTING BURIED PIPELINE DEPTH AND LOCATION WITH ELECTROMAGNETIC TRIANGULATION

TECHNICAL FIELD

This invention relates to means for finding underground conductors and more particularly it relates to pipeline finders capable of surveying underground pipeline location and depth.

BACKGROUND ART

It has been known in the art to determine the transit path of a pipeline, or like underground conductor such as a wire cable, by means of exciting the underground inductor with an electromagnetic excitation signal which is in turn radiated from the pipeline and using a pair of pipeline straddling antennas to detect and amplify signals for binaural directions into a surveyor's binaural headphone set. See, for example, U.S. Pat. No. 4,112,349—H. J. Weber, Sept. 5, 1978.

A complicated multiple electromagnetic conductor detection device for sensing electrical current in buried pipelines is described in U.S. Pat. No. 4,134,061—H. S. Gudgel, Jan. 9, 1979.

It has in the past not been feasible to detect and work with simple detected variable amplitude signals, when accurate measurements are needed, because of the variations of signal amplitudes receivable because of pipeline location, foreign buried conductors in the vicinity, and difficulties in instrumentation because of variations of gain, etc.

The underground depth of the conductor has been satisfactorily determined only by means of phase comparison from signals at two vertically spaced antennas and then computing from the phase difference, the depth. However, this process is extremely critical in terms of frequencies used, the phase comparison technique, etc. Thus, the equipment is expensive and not readily suited for rugged field usage. A system of this type is found in U.S. Pat. No. 4,220,913—M. I. Howell et al., Sept. 2, 1980.

Techniques are also known in the prior art for measuring or logging distances over which measurements are taken along an underground pipeline. In this respect, U.S. Pat. No. 4,151,458 issued Apr. 24, 1979 to W. H. Seager, electrically connects a measuring wire line to the pipeline and unrolls it from a reel along the measurement distance. U.S. Pat. No. 2,105,247 issued Jan. 11, 1938 to J. J. Jakosky, unwinds an electrical conductor connected to measuring electrodes advanced along the pipeline and unwound from a reel which rotates to advance a recording strip chart.

In general a system for a manual assist survey of an underground pipeline requires accurate readings and simple operation under various conditions to be encountered in the field. To save manpower and thus time and cost of surveys, calculations should be made automatically and directly and the instrumentation should not require manual judgment, manipulation or adjustment. In particular, skilled operators such as surveyors or mathematicians should not be required.

Thus, it is a general objective of this invention to provide an improved simplified manually positioned automatic pipeline depth and offset location calculating instrument useful for surveying pipelines and the like. Other objects, features and advantages of the invention will be found throughout the description, drawings and claims.

DISCLOSURE OF THE INVENTION

It has thus been discovered in accordance with this invention that signal amplitude variation may be used in a simple accurate system for direct readout of both depth and orientation distances. This may be achieved by employing a mount bar of fixed length between two reception locations supported a known distance from the surface in a triangulation computation method characterized by two orthogonally disposed antennas in corresponding sets at each reception location, to receive electromagnetic signals radiated from the pipeline at some desired frequency, preferably 640 Hz. Each antenna in each set preferably comprises a ferrite rod with a solenoid coil wound thereon, thereby providing four detected signals, which are multiplexed into a single amplification channel with automatic gain control for maintaining output signals within a preferred range of amplitudes for digitizing the respective signal amplitudes. The desired depth and offset location of the pipeline are calculated therefrom in an electronic calculator for digital readout. Thus, the instrument may be used continuously to survey a pipeline providing the two sets of antennas are located on opposite sides thereof. The signals may be automatically recorded upon a medium advanced by distance measuring instrumentation.

THE PREFERRED EMBODIMENT

Figure 1:
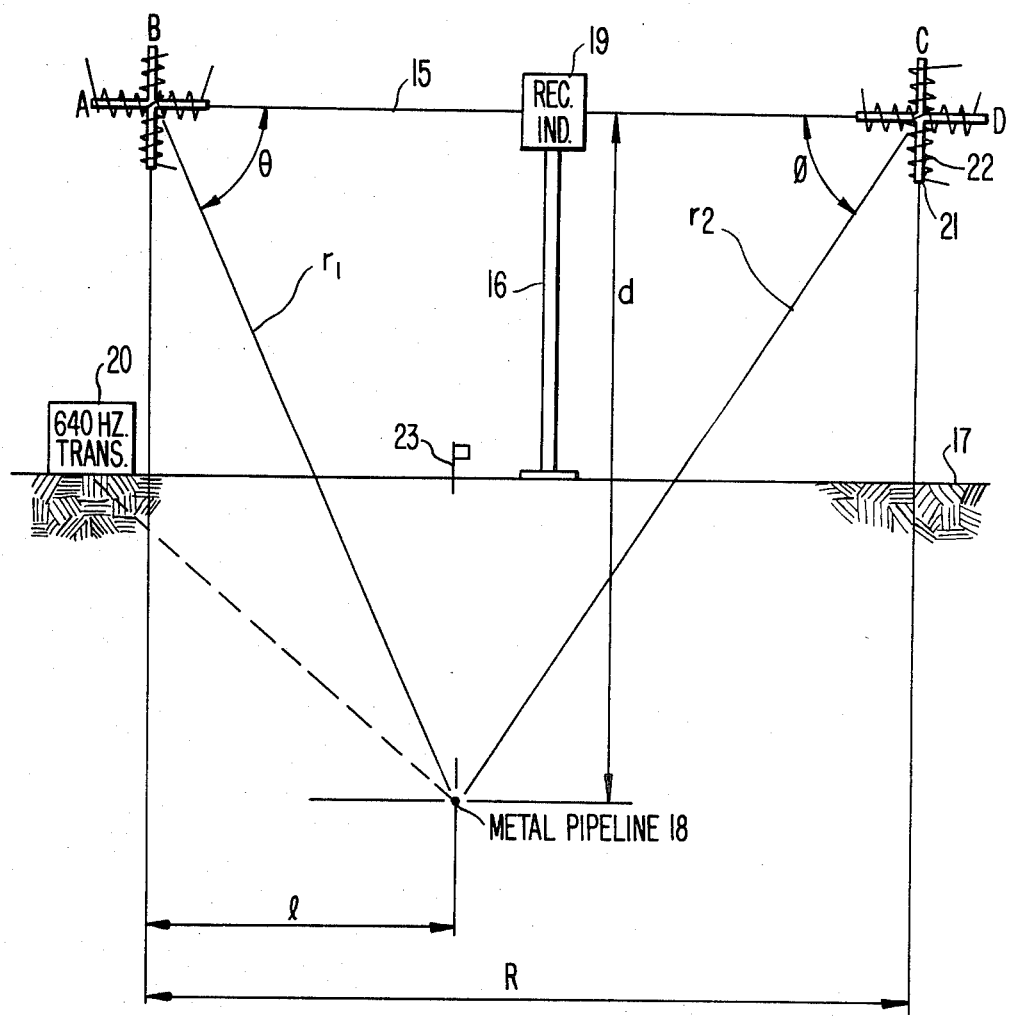
FIG. 1 is a diagrammatic sketch looking into a pipeline of the system in operation on the surface at the location of an underground pipeline.

In FIG. 1, it is seen that two sets A,B and C,D of orthogonally oriented antennas A, B, C and D are separated a space of several feet by a rod 15. They are also supported by post 16 a known distance from the ground surface 17 in which pipeline 18 is buried. If the unit is carried on the back of a person, it is supported the known distance from the ground in this alternative manner. To wit, a portable receiver-indicator unit 19 is manually moved along the pipeline 18 with only one operating criterion, namely that the orthogonal antenna sets A,B and C,D straddle the pipeline 18. By observing the angles $\theta$, $\phi$ and the distances $r_1$, $r_2$ it is seen that by triangulation, we can readily calculate the offset distance 1 of the pipeline from one antenna set A,B and the depth d, which gives the underground distance because of fixed post distance 16.

Transmitter 20, for example, radiates electromagnetic energy at 640 Hz underground with enough power to induce electromagnetic energy along underground pipeline 18 for producing detectable radiation at the site of the receiver unit 19 and antenna sets A,B and C,D. Alternatively a conductive connection pair to earth and the pipeline 18 may be used from transmitter 20. Each antenna unit preferable comprises a ferrite rod 21 with a solenoid winding 22 thereon. One such rod 21 of each set (B,C) is vertically disposed and the other (A,D) is horizontally disposed.

When the receiver-indicator 19 calculates and displays the offset distance 1, a marker such as flag 23 may be introduced in the ground surface as a survey marker post directly over the pipeline location and the flag may carry a notation of the distance below the surface to the pipeline.

Figure 2:
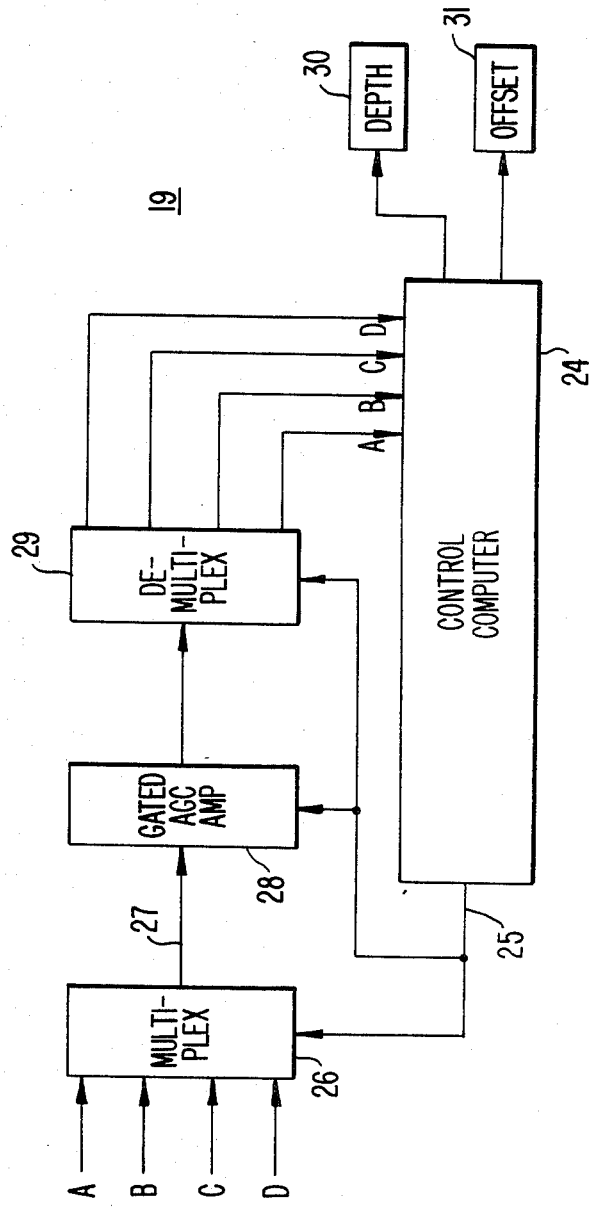
FIG. 2 is a general block diagram of the system for calculating from four particular detected signals the depth and offset distances of the pipeline from the location of the instrumentation.

As seen from FIG. 2, the portable receiver-indicator unit 19 preferably processes the signals from the four antennas A, B, C, D to provide both depth and offset distance readings in visible form for reading of the surveyor in situ without calculation. These may be recorded if desired or stored in the computer 24 which controls the multiplexing-gating-demultiplexing operation by way of lead 25. Thus the four detected signals A, B, C, D of various amplitudes depending upon pipeline location and depth are multiplexed by multiplexer 26 into a single channel 27 feeding AGC amplifier 28.

The AGC amplifier 28 serves the important purpose of making certain that a set of variable amplitude signals A, B, C, D is available all within a range of amplitude (1 to 3 volts) which is compatible with processing circuits such as demultiplexer 29 and the calculating circuits in computer 24. Then the computer 24 is programmed to work out the triangulation results and to provide readout entries for the depth at 30 and offset distance at 31.

Note that the AGC amplifier 28 is of the gated type and thus the AGC is turned off during the sampling period to permit the individual signals A, B, C or D to find their own level and be a true representation of their instantaneous amplitude unaltered by the AGC action. Other means may be used to achieve this function as will be described hereinafter. In this embodiment by means of lead 25 the control computer 24 provides a periodic sampling in sequence of the signals A, B, C and D in a repetitive cyclic pattern. For 640 Hz square wave radiated electromagnetic signals, 25 m.s. samples are taken 40 times per second under control of computer 24.

Figure 3:
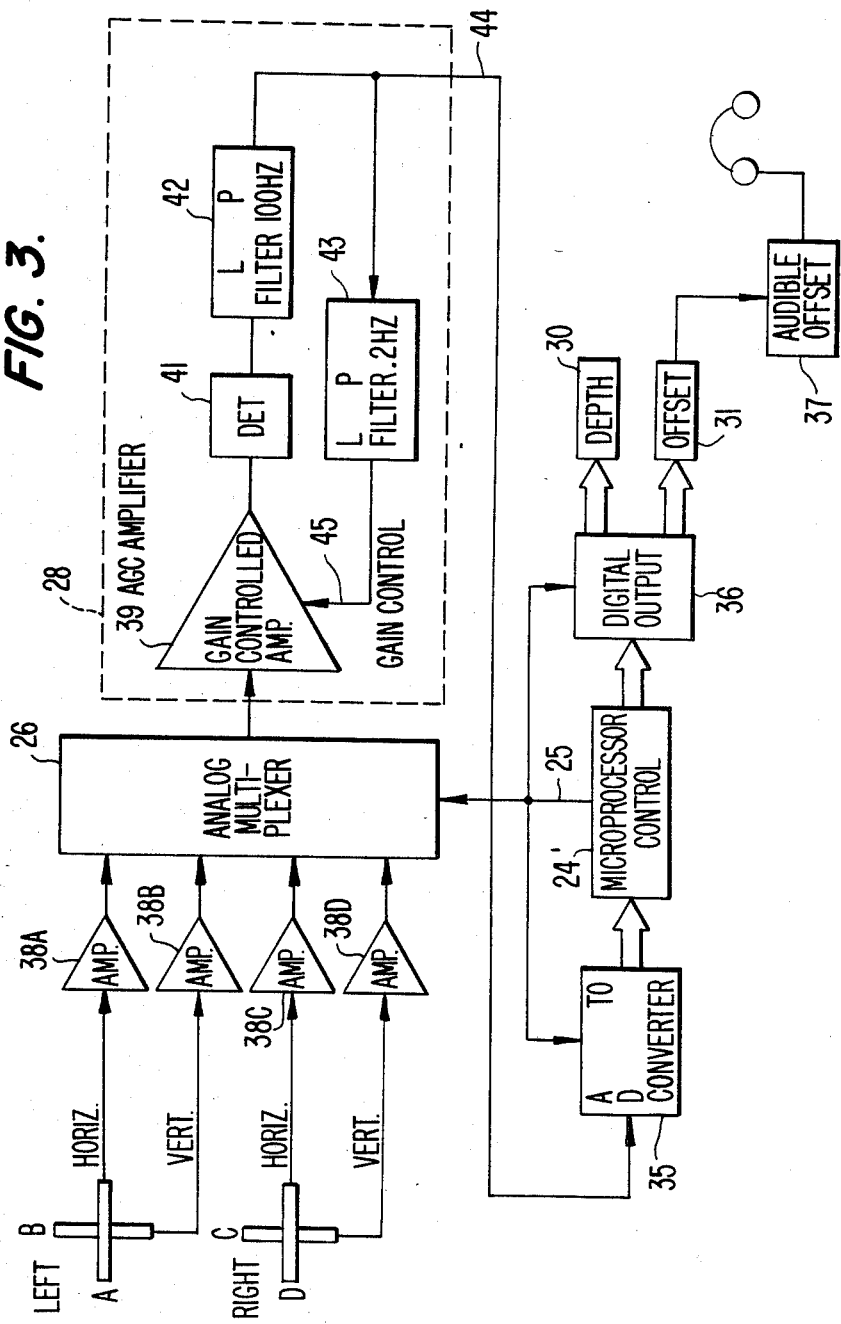
FIG. 3 is a system block diagram of the preferred embodiment of the invention.

The preferred computer embodiment of FIG. 3 generally follows the general format described and uses like reference characters where applicable with primes indicating general functional similarity but different details. It is noted that in this case the computer 24' is a digital microprocessor, such as available from the Synapse Corp., Model CP06805. This is primarily a Motorola 1.4-6805E2 digital computer having a National ADC0831 analog to digital conversion unit 35. The microprocessor 24' has register means 36 for storing digital output readings on the depth 30 and offset 31 indicators, or for alternatively or simultaneously recording into a memory bank or on a strip recorder, if desired also for the offset signals 31 an audible tone is derived at 37, to enable an operator to keep the survey unit antenna sets A,B and C,D astraddle the pipeline during the course of a survey. This signal is not critical but it greatly enhances the speed and agility with which the instrument may be used to trace the course of a pipeline on a survey mission.

Each channel has an adjustable gain tuned (at 640 Hz) amplifier channel 38A, 38B, etc. These have gain set only for calibrating the instrument, and typically provide a 50 DB signal gain. Thereafter the output level gain at lead 44 is held within a preferred range (0–5v) for digital processing at the digital converter 35 by means of AGC amplifier 28, which is compensated to permit individual signal sampling of instantaneous voltage levels while maintaining the system gain at an optimum level.

In the AGC amplifier system, the amplifier 39 has a feedback loop comprising detector 41, a first low pass (100 Hz) filter 42 and a second low pass (0.2 Hz) filter 43. This provides an output signal at lead 44 for the A-D converter 35 and a feedback gain control signal at lead 45. With 640 Hz square wave signals sampled 40 times per second at 25 m.s. sampling periods, this system functions to establish the desired overall gain control while passing the appropriate instantaneous levels (1 to 3v) of the signal samples to the A-D converter 35 along lead 44. These samples are processed by programming the microprocessor 24' to average each signal amplitude against the prior four amplitude samples to serve as a digital filter, and the averaged signal amplitude for each channel A, B, C and D is used in the triangulation calculations programmed in the microprocessor 24' to derive the depth (30) and offset (31) distances.

The general operation and derivation of the depth and offset distance readings follows.

The signals from the coils are connected to adjustable-gain amplifiers 38 tuned to the transmitter unit frequency of 640 hertz. The gains of these amplifiers are preset to compensate for minor variations in antenna A, B, C, D sensitivities. The outputs of the amplifiers are connected to analog signal multiplexer 26 which provides an output signal which is a time multiplexed sequence of the four inputs A, B, C, D. This multiplexing is controlled synchronously by the microprocessor 24' switching and timing circuitry.

To maximize dynamic range, automatic gain control (AGC) amplifier 28 is used to compensate for overall variations in input signal levels. This AGC amplifier is designed so that relative signal level variations between sensors A, B, C, D are not equalized, but overall variations due to equivalent decreases in all four antenna sensors are compensated for. Therefore, the output of the AGC amplifier has a constant average amplitude, but relative amplitudes between the four sensor signals are preserved. The AGC amplifier is comprised of a gain controlled amplifier 39, detector 41, low-pass filter 42 and loop filter 43 of lower frequency, all connected in a gain control feedback loop. The output of the first low-pass filter is a signal of constant average amplitude with variations in instantaneous DC amplitude level corresponding to the sampled sensor signals.

The output amplitude of the AGC amplifier is connected to analog-to-digital (A/D) converter 35 which converts the instantaneous DC levels to digital outputs corresponding to the input signals. The microprocessor 24' controls the conversion timing and inputs the digitized data and retains them for calculations.

Thus, the microprocessor 24' accepts the digitized data, computes the depth 30 and offset 31 distances using the equations derived hereinafter. It provides digital readouts of the depth and offset, and controls the synchronous timing of the analog signal multiplexer 26, A/D converter 35 (demultiplexer) and the digital output register 36.

To obtain analog output signals, the digital output register 36 multiplexes the output of the microprocessor 24' to the proper digital-to-analog (D/A) converter. The outputs of the D/A converters are DC voltages proportional to the depth and offset. These voltages are suitable for recording on a strip chart recorder. In addition, an audible offset indicator 37 connected to the offset indication output is used to aid the instrument operator in maintaining the sensor assembly sets A,B and C,D on opposite sides of the buried pipeline 18 structure.

The preferred implementation of the invention in FIG. 3 is referenced for illustrative purposes. Other methods and variations of implementing this invention are possible, including the use of alternate magnetic field sensors containing semiconductor devices or coils without ferrite material, the use of alternate signal processing and calculation means such as an analog implementation of the multiplication and division operations or the use of digital multiplication and division units, the use of other displays of the calculated parameters, such as recorders on magnetic or semiconductor media.

DERIVATION OF DEPTH AND OFFSET EQUATIONS FOR CALCULATION

The sensor configuration shown in FIG. 1 has an orthogonal pair of sensors A and B spaced a distance R from another pair of orthogonal sensors C and D. The conductor being located is any location l offset from sensor pair A,B and depth d beneath the sensors as shown in the figure. Assume an AC current I flowing in the conductor, causing a cylindrical field to surround the conductor. The field strength at any distance r from the center of the conductor is described by the equation $$B = \frac{\mu_o I}{2\pi r}$$

where $\mu_o$ is the free-space permeability. Taking into consideration the portion of the field that each sensor intercepts, the sensor voltages are $$V_A = \frac{\mu_o k I \sin \theta}{2\pi r_1} \quad V_D = \frac{\mu_o k I \sin \phi}{2\pi r_2}$$

$$V_B = \frac{\mu_o k I \cos \theta}{2\pi r_1} \quad V_C = \frac{\mu_o k I \cos \phi}{2\pi r_2}$$

where k is a sensor sensitivity factor. Taking the ratios of these voltages yields $$\frac{V_A}{V_B} = \frac{2\pi \mu_o k r_1 I \sin \theta}{2\pi \mu_o k r_1 I \cos \theta} = \tan \theta$$

$$\frac{V_D}{V_C} = \frac{2\pi \mu_o k r_2 I \sin \phi}{2\pi \mu_o k r_2 I \cos \phi} = \tan \phi$$

but $$\tan \theta = \frac{d}{l} \text{ and } \tan \phi = \frac{d}{R - l}$$

so $$\frac{V_A}{V_B} = \frac{d}{l} \text{ and } \frac{V_D}{V_C} = \frac{d}{R - l}.$$

Solving these two equations for d and l yields:

$$d = \frac{V_A V_D R}{V_A V_C + V_B V_D} \text{ and } l = \frac{V_B V_D R}{V_A V_C + V_B V_D}.$$

Alternately, if the offset of the pipe is measured from the center of the sensor array, then:

$$d = \frac{V_D R}{V_A V_C + V_B V_D} V_A \text{ and } l' = \frac{V_D R}{V_A V_C + V_B V_D} V_B - \frac{R}{2}.$$

These equations were derived assuming that each pair of sensors is colocated. This is not possible with some sensors, but experimental tests have shown that an empirical linear or quadratic equation be applied to correct for this deviation from the assumed geometry.

It is to be recognized that any person skilled in the art can program the microprocessor 24' for these simple calculations. Clearly the use of the spaced orthogonal sensor sets A,B and C,D provides signals which permit the simple derivation of the depth and lateral offset position of the pipeline 18 by conventional calculating methods at this state of the art whether digital or analog.

Figure 4:
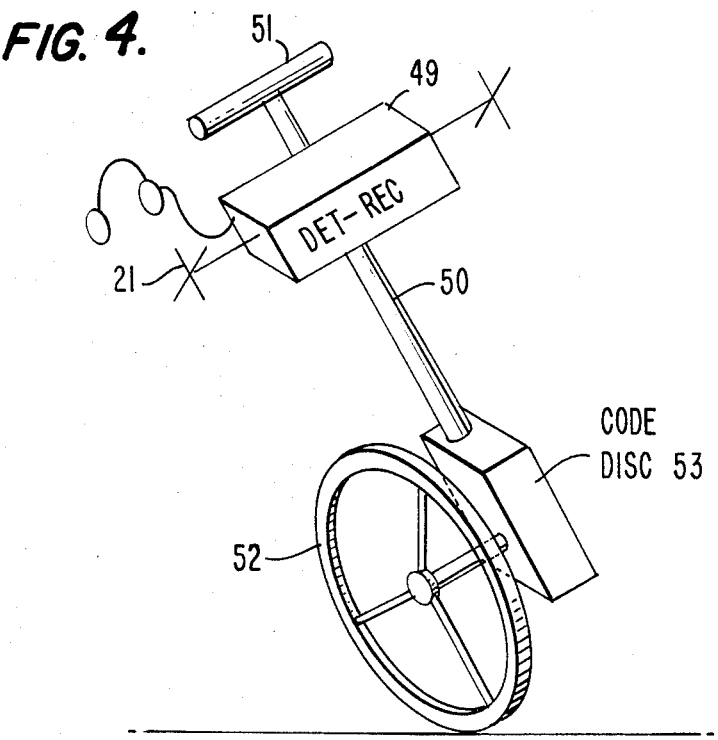
FIGS. 4-5 show instrumentation for advancing a recorder medium to relate readings with particular locations along the pipeline.

As may be seen from FIG. 4, the instrumentation of this invention is readily portable. Thus, both the detector hereinbefore described with detector coils 21 and a built-in recorder with a paper or magnetic tape medium as desired designated as unit 49 may be mounted on shaft 50 for manual advancing with handle 51 on wheel 52. In this embodiment an optical code disc 53, or the like, is rotated by wheel 52 of known calibrated circumference in contact with the earth as the conveyance is pushed along the pipeline course. Thus, pulses are produced for advancing the recorder medium proportionally to the distance travelled.

Figure 5:
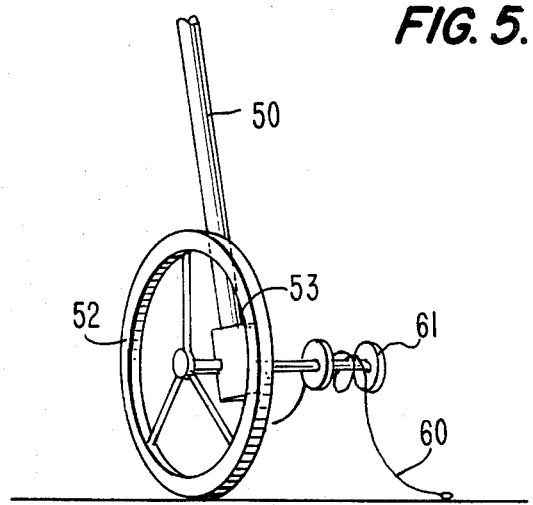

The embodiment of FIG. 5 is similar in purpose, but employs a slack chain principal of measurement. That is the slack plastic cord 60, or the like, laid out along the course of the pipeline is wrapped around drum 61 of known calibrated circumference to turn the encoding disc assembly 53 and measure the course distance as the instrument is moved along the pipeline. In both cases a predetermined number of electrical pulses per wheel revolution may be generated for appropriate recording medium advancement rates. This slack chain principle is particularly appropriate if the unit is carried on the back of a person and the chain is manually manipulated.

Thus, the instrumentation is well adapted for one person surveys to move a manual transport conveyance such as shown along the pipeline course to record the depth and offset data. A temporary marker such as chalk line can be deposited from the transport conveyance to utilize the offset data on the recorded medium. The slack line 60 may be left in place for the same purpose. Therefore the instrumentation may produce recorded data located as a function of the movement of the conveyance for identifying signals at specific pipeline locations from a single person surveyor.

OPERATING PROCEDURE

To describe the use of the invention, the operating procedure for surveying the position of a buried pipeline is as follows: The output of the transmitter unit 20 (FIG. 1) is connected to a cathodic protection test point and a distant grounded metal electrode (or alternately radiating in the vicinity of the pipeline 18) at a position where the pipeline 18 radiates the signals receivable by the antenna sets A,B - C,D straddling the pipeline 18. The sensor assembly is then positioned over the pipe and oriented perpendicular to the pipe axis by use of the audible signal 37 (FIG. 3). The operator positions the sensor assembly to obtain a minimum tone indication from the receiver unit audible tone output. The operator then advances along the pipeline making adjustments in the direction of travel to maintain the minimum tone to trace the pipeline A chart recorder is attached to the depth and location outputs from the receiver unit. Thus, as the operator moves the receiver unit along the pipeline, a continuous recording of pipe depth and location is obtained. If only depth information is required, the operator need not maintain the minimum tone indication as long as the sensor array is kept within a reasonable lateral orientation relative to the pipe.

Having therefore advanced the state of the art, those novel features believed descriptive of the nature and spirit of the invention are defined with particularity in the claims.

We claim:

1. In instrumentation for determining the depth and offset position of a buried pipeline, or like buried conductor, from a surface located instrument sensing position, having an antenna array disposing two sets of two orthogonally disposed magnetic field detectors at a predetermined spacing apart and predetermined spacing from the surface, the improvement comprising, means for inducing an electromagnetic signal into the buried pipeline to radiate signals along the pipeline detectable by said detectors which are readily processable to produce pipeline depth and location data, computation means for processing radiated signals detected from the pipeline by the four detectors to calculate from the ratios of the voltages detected by the respective antennas in said sets the depth of the pipeline below the surface and to indicate offset of the pipeline between the sets of detectors with the detector sets respectively disposed on opposite sides of the pipeline, means for multiplexing the signals detected by the four detectors into a single channel amplifier, automatic gain control means for the amplification channel operable to stabilize the amplitude range as a function of the accumulative amplitudes of the four signals produced by the detectors, means for sampling and isolating the detected signals for the respective detectors for a specified time period, and means disabling the automatic gain control means from stabilizing the instantaneous gains of the sampled signals.

2. In instrumentation for determining the depth and offset position of a buried pipeline, or like buried conductor, from a surface located instrument sensing position, having an antenna array disposing two sets of two orthogonally disposed magnetic field detectors at a predetermined spacing apart and predetermined spacing from the surface, the improvement comprising, means for inducing an electromagnetic signal into the buried pipeline to radiate signals along the pipeline detectable by said detectors which are readily processable to produce pipeline depth and location data, computation means for processing radiated signals detected from the pipeline by the four detectors to calculate from the ratios of the voltages detected by the respective antennas in said sets the depth of the pipeline below the surface and to indicate offset of the pipeline between the sets of detectors with the detector sets respectively disposed on opposite sides of the pipeline, means for multiplexing the signals detected by the four detectors into a single channel amplifier, automatic gain control means for the amplification channel operable to stabilize the gain as a function of the accumulated strength of the four signals produced by the detectors, and means for permitting each of the amplified individual multiplexed signals from the respective detectors to vary instantaneously.

3. Instrumentation as defined in claim 2 wherein the radiated signals are of a frequency of 640 Hz, including means for multiplexing the signals from the four detectors into a single channel amplifier having automatic gain control by multiplexing at a sampling rate of 40 per second and sampling 25 millisecond samples, wherein the amplifier has a feedback closed loop for gain control including a 0.2 Hz low pass filter.

4. Instrumentation as defined in claim 3 including means deriving sampled signals from the gain control loop through a 100 Hz low pass filter, and digitally filtering the signal amplitudes by averaging the amplitude of a set of a plurality of successive samples, and calculating said offset and depth from the digitally filtered sample sets.

* * * * *